United States Patent [19]

Vouros

[11] Patent Number: 4,896,403
[45] Date of Patent: Jan. 30, 1990

[54] DOUBLE CORD CLINCH

[76] Inventor: Gregory C. Vouros, 2120 8th Ave. W., Seattle, Wash. 98119

[21] Appl. No.: 207,074

[22] Filed: Jun. 15, 1988

[51] Int. Cl.⁴ ............................................. F16G 11/00
[52] U.S. Cl. ................................... 24/130; 24/115 H
[58] Field of Search ................. 24/130, 129 R, 129 D, 24/115 H, 115 K, 30.5 R, 117, 129 A; 135/118

[56] References Cited

U.S. PATENT DOCUMENTS

| | | |
|---|---|---|
| 914,768 | 3/1909 | Walker et al. . |
| 1,379,093 | 5/1921 | Freeberg . |
| 2,449,235 | 9/1948 | Krupp ................................... 24/130 |
| 3,574,900 | 4/1971 | Emery . |
| 3,629,909 | 12/1971 | Riley ................................ 24/130 X |
| 3,813,737 | 6/1974 | Larsen . |
| 4,112,551 | 9/1978 | Sales . |
| 4,361,938 | 12/1982 | Emery . |
| 4,455,717 | 6/1984 | Gray . |

*Primary Examiner*—James R. Brittain
*Attorney, Agent, or Firm*—Robert W. Beach; Ward Brown

[57] ABSTRACT

A clinch for a double cord has a cylindrical body with a diametral passage through the body for the double cord and a flaring mouth arranged symmetrically with the cord passage. The opposite faces of the flaring mount have buttress teeth parallel to the cord passage with the abrupt faces of the teeth facing away from the cord passage for gripping cord portions that are parallel as they pass through the cord passage and are pulled away from each other toward the bottom of the flared mouth to grip them.

2 Claims, 2 Drawing Sheets

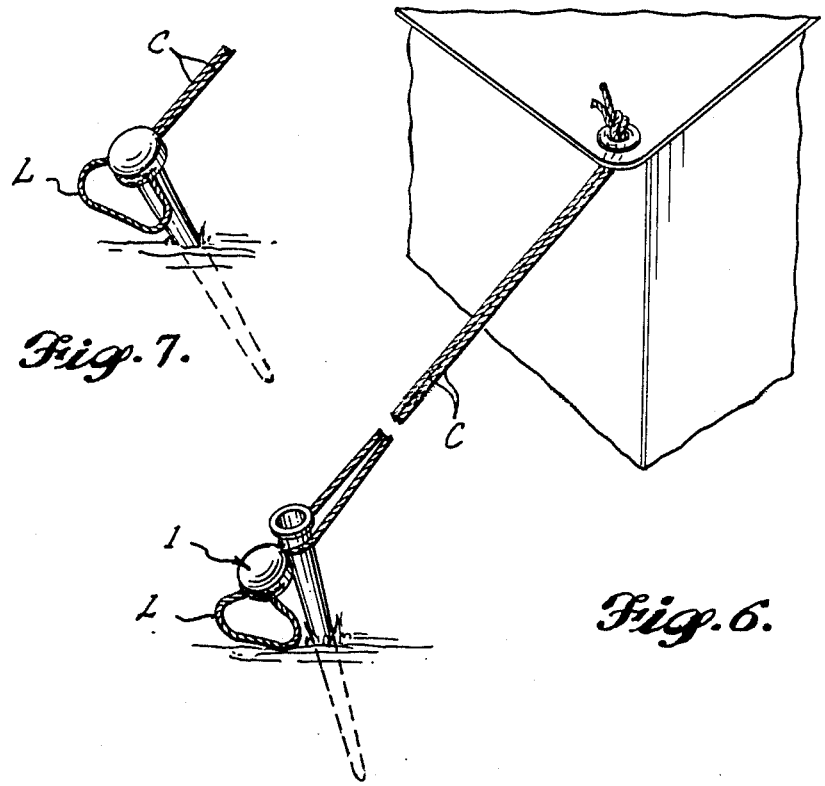
Fig. 7.
Fig. 6.
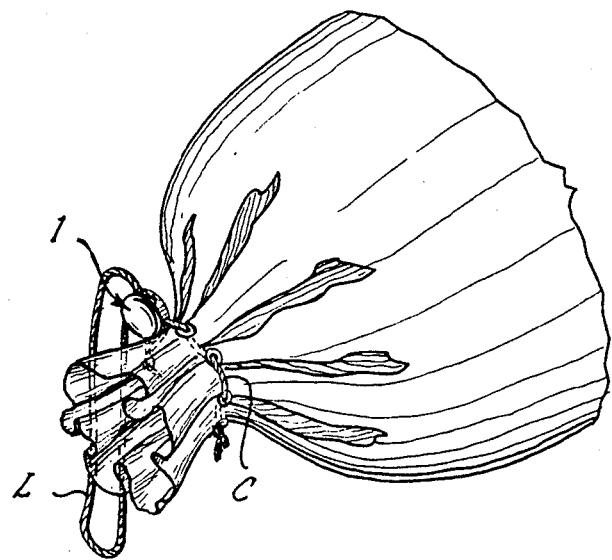
Fig. 8.

DOUBLE CORD CLINCH

BACKGROUND OF THE INVENTION

1. Field of the Invention

This invention relates to a clinch for gripping two cords in side-by-side relationship to prevent them from slipping relative to a holder.

2. Prior Art

Sales U.S. Pat. No. 4,112,551, issued Sept. 12, 1978 discloses a drawstring puller and fastener for securing two cords by clamping them between relatively rotatable threaded members. The Gray U.S. Pat. No. 4,455,717, issued June 26, 1984, also shows a double cord holder having two clamping members between which the cord stretches extend that are pressed together by a ring or nut having a flared internally threaded bore mating with cooperating tapered externally threaded segments of clamping jaws. These devices are more complicated than the clinch of the present invention by being composed of a plurality of components that are relatively movable.

The Freeberg U.S. Pat. No. 1,379,093, issued May 24, 1921, discloses a double cord holder in which the cords are secured by a spring-pressed plunger slidably received in a spherical block. The Larsen U.S. Pat. No. 3,813,737, issued June 4, 1974, also shows a double cord holder in which the cords are held by a spring-pressed plunger slidably mounted in a block 20. Holders of this type again involve relatively movable parts, and the tightness of the grip on the cords is dependent on the force produced by the spring acting on the plunger.

Another cord holder having relatively movable parts is shown in Walker et al. U.S. Pat. No. 914,768, issued Mar. 9, 1909, which has pivoted jaws tilted to press against the cords by the tension exerted on the cords, but in order to hold the cords reliably, tension must be maintained on them. Moreover, this holder holds cords that extend in opposite directions from the holder instead of holding cords extending alongside each other, as in the other patents discussed above.

A cord holder which does not have relatively movable parts and which is intended to hold cords alongside each other is shown in FIGS. 11 to 15 of Emery U.S. Pat. No. 3,574,900, issued Apr. 13, 1971. This device is rather bulky, however, and would not hold cords as reliably or be as easy to use as the clinch of the present invention.

FIGS. 1 to 10 of Emery U.S. Pat. No. 3,574,900 and Emery U.S. Pat. No. 4,361,938, issued Dec. 7, 1982, show devices for holding a single cord, but they would not be adapted for holding a double cord.

SUMMARY OF THE INVENTION

A principal object of the present invention is to provide a cord holder for holding double cords in side-by-side relationship that does not have relatively movable parts, is compact and will hold cords securely.

Another object is to provide such a cord holder that can be set easily to hold double cords, will hold such cords reliably as long as desired and from which the cords can subsequently be released easily.

A further object is to provide a clinch for a double cord that is economical to produce such as being made of molded plastic material.

It is also an object to provide such a clinch that can be molded in a single piece rather than being required to be fabricated by assembling a number of pieces.

The foregoing objects can be accomplished by a clinch having a generally cylindrical body with a diametral passage through it for a double cord and a deep chordal notch into which such diametral passage opens, which notch flares outwardly and is serrated with a series of buttress teeth extending generally parallel to the passage through the body.

BRIEF DESCRIPTION OF THE DRAWINGS

FIG. 6 is a top perspective of the cord clinch used in a tent tie-down, and FIG. 7 is a top perspective of the clinch carried by a tent peg.

FIG. 8 is a top perspective of the clinch being used to hold a bag drawstring.

DETAILED DESCRIPTION

Figure 1:
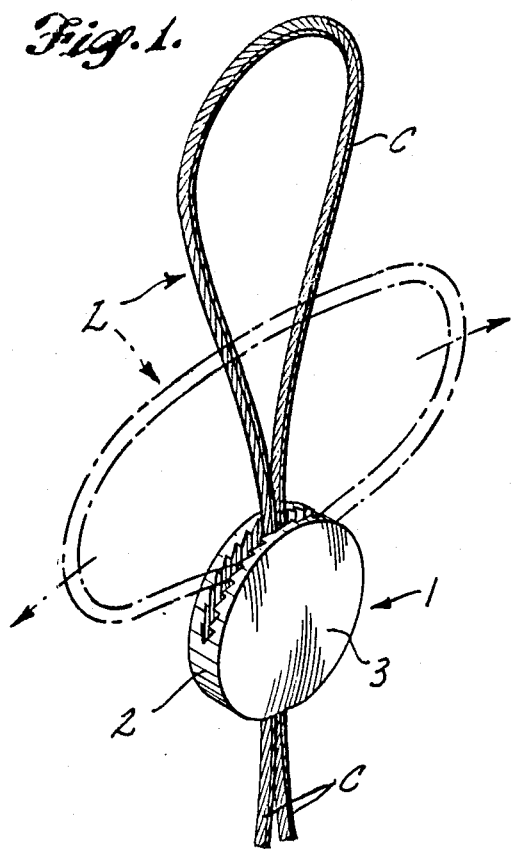
FIG. 1 is a top perspective of the cord clinch applied to a double cord.

The double cord clinch of the present invention has many practical applications, but it is most useful where the clinch is applied to a double cord C having stretches alongside each other at one side of the clinch and forming a loop L at the opposite side of the clinch as shown in FIG. 1.

The clinch 1 is a button 2 preferably having a cylindrical periphery joining opposite circular, preferably bulging, sides 3. A passage 4 extends diametrically through the clinch body, the cross section of which preferably is flattened for snug passage through it of two stretches of cord C in side-by-side relationship.

Figure 4:
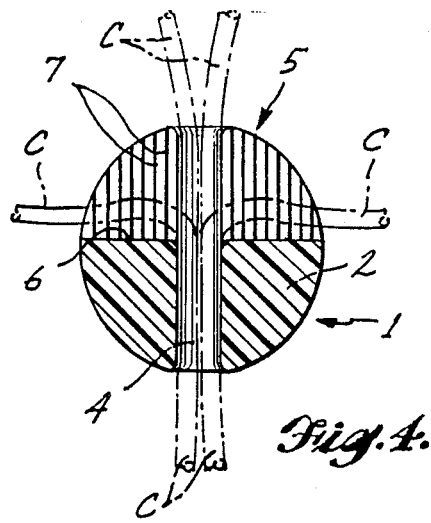
FIG. 4 is a central section through the cord clinch taken on line 4—4 of FIG. 2 showing in phantom the manner in which the clinch would be applied to a double cord.
Figure 3:
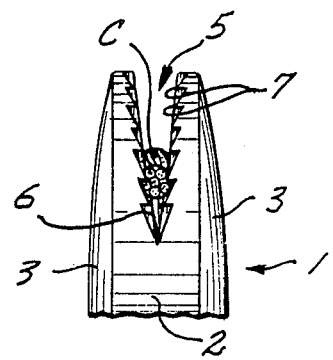
FIG. 3 is a fragmentary edge elevation of the cord clinch shown with a cord held by it.
Figure 2:
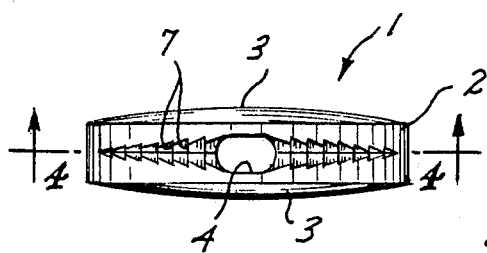
FIG. 2 is a plan of the cord clinch without the cord.
Figure 5:
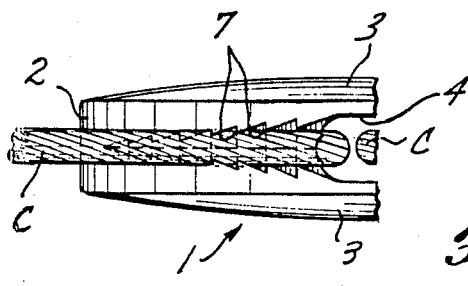
FIG. 5 is an enlarged plan of the clinch and a double cord with parts broken away.

As shown best in FIGS. 3 and 4, one edge of the body has in it an outwardly flaring deep chordal notch or mouth 5 arranged symmetrically and coplanar with the passage 4 and which preferably extends through almost one-half of the width of the clinch. The bottom of the mouth is formed by two radial lines 6 disposed at a large dihedral angle such as 120 degrees to 180 degrees.

The opposite sides of the mouth have friction surfaces for engaging opposite sides of cord stretches. While the friction surfaces may be formed by knurling, ribbing or serrations, it is preferred that the friction surfaces be formed by small buttress teeth 7 arranged in parallel relationship substantially parallel to the passage 4. The crests of such teeth should be quite sharp and the abrupt sides of the teeth face away from the passage 4.

When a double cord C is threaded through the passage 4 of the clinch and the stretches of the cord at the mouth side of the clinch are spread apart, as shown in broken lines in FIGS. 1 and 4, the double cord will be secured against being pulled through the passage 4 by tension applied to the double cord projecting from the side of the clinch opposite the mouth 5. Engagement of the cord stretches in the mouth 5 with the friction faces or buttress teeth 7 will prevent the cord stretches at the mouth side of the passage 4 from moving into the mouth. The greater the pull exerted on the double cord projecting from the side of the clinch opposite the mouth 5, the more securely the cord stretches will be engaged with the friction faces or teeth in the mouth to grip such stretches tighter.

FIG. 4 shows that when the stretches of the double cord C are spread apart, such cord stretches extend transversely of the buttress teeth 7 and FIG. 3 shows a cord wedged between the teeth on the opposite sides of the mouth 5 near the bottom of such mouth.

While tension on the stretches of the double cord C projecting from the side of the clinch opposite the mouth 5 will not dislodge or move lengthwise the stretches of cord C anchored in the mouth as described above, the cord stretches in the mouth can be released readily for movement through the passage 4 simply by deflecting the cord stretches in the mouth toward parallelism as indicated in the central positions of the cords in FIG. 4. When in such position, the clinch can be moved easily along the double cord C into a desired position. When such position is reached, the stretches of cords C in the mouth 5 can again be spread apart to be gripped between the inner portions of the mouth friction surfaces so as again to be secured in position by the clinch.

A representative utilization of the clinch 1 is illustrated in FIG. 6 as being applied to a tent corner holddown. The loop L of the clinch is at the side of the body 2 remote from the tent and the stretches at the other side of the body are placed on opposite sides of a tent peg and the clinch is slid along the double cord up to the tent peg. As the clinch reaches the tent peg, the sides of the loop can be spread apart so that the clinch will grip the double cord and hold the body 2 against the tent peg. Actually, the clinch can be mounted on or formed as an integral part of the tent pegs, as shown in FIG. 7.

In FIG. 8, the clinch 1 is shown as being applied to the drawstring or drawcord C of a dunnage bag. When the clinch has been slid toward the neck of the dunnage bag with the loop at the side of the clinch body 2 remote from the bag neck, the opposite stretches of the loop L can be spread to be gripped by the teeth 7 in the inner portion of the flaring mouth to hold the clinch body snugly against the neck of the bag.

The clinch can be molded easily of plastic in a single piece in a simple two-part cavity mold. As shown in FIG. 4, the body 2 is solid except for the deep flaring notch mouth and the passage 4. The passage can be formed by a mandrel in the mold that is withdrawn lengthwise of the passage following the molding operation. The draft of the flaring mouth and the parallel arrangement of the buttress teeth 7 enable a mold insert to be withdrawn readily out of the mouth after the molding operation. As a matter of fact, a single removable mold core can be used to form both the through diametral passage 4 and the flaring mouth 5 with its buttress teeth.

What is claimed:

1. A clinch for a double cord comprising a body having a passage therethrough for snug reception therein of a double cord and a flaring mouth in communication with said passage and disposed generally coplanar with said passage and extending to a margin of said body, said flaring mouth having an inner extremity extending on a line perpendicular to and on both sides of said passage and opposite friction sides flaring from said inner extremity for gripping the cords of the double cord when the cords are spread apart, said opposite friction sides having teeth parallel to and at opposite sides of said passage extending substantially from said inner extremity of said flaring mouth to the margin of said body.

2. The clinch defined in claim 1, in which the teeth are buttress teeth, having abrupt sides facing away from the passage.

* * * * *

UNITED STATES PATENT AND TRADEMARK OFFICE
CERTIFICATE OF CORRECTION

PATENT NO. : 4,896,403
DATED : January 30, 1990
INVENTOR(S) : Vouros, Gregory C.

It is certified that error appears in the above-identified patent and that said Letters Patent is hereby corrected as shown below:

ON THE TITLE PAGE:
    Section [57] ABSTRACT: line 5 of the ABSTRACT, cancel "mount" and insert "mouth".

Claim 2: column 4, line 35, cancel the "," (comma) after "teeth".

Signed and Sealed this

Eighth Day of January, 1991

Attest:

HARRY F. MANBECK, JR.

Attesting Officer     Commissioner of Patents and Trademarks